United States Patent
Pandey et al.

(10) Patent No.: US 9,870,467 B2
(45) Date of Patent: Jan. 16, 2018

(54) APPARATUS AND METHOD FOR IMPLEMENTING A FORKED SYSTEM CALL IN A SYSTEM WITH A PROTECTED REGION

(71) Applicant: Intel Corporation, Santa Clara, CA (US)

(72) Inventors: Prashant Pandey, Stony Brook, NY (US); Mona Vij, Hillsboro, OR (US); Somnath Chakrabarti, Portland, OR (US); Krystof C. Zmudzinski, Forest Grove, OR (US)

(73) Assignee: Intel Corporation, Santa Clara, CA (US)

( * ) Notice: Subject to any disclaimer, the term of this patent is extended or adjusted under 35 U.S.C. 154(b) by 251 days.

(21) Appl. No.: 14/671,346

(22) Filed: Mar. 27, 2015

(65) Prior Publication Data

US 2016/0283409 A1    Sep. 29, 2016

(51) Int. Cl.
G06F 9/46 (2006.01)
G06F 21/53 (2013.01)
G06F 21/57 (2013.01)

(52) U.S. Cl.
CPC ............. G06F 21/53 (2013.01); G06F 21/57 (2013.01)

(58) Field of Classification Search
CPC ....................................... G06F 12/14–12/1491
See application file for complete search history.

(56) References Cited

U.S. PATENT DOCUMENTS

| | | | |
|---|---|---|---|
| 6,769,119 B1 * | 7/2004 | England | G06F 9/4843 717/143 |
| 8,769,495 B1 * | 7/2014 | Gupta | G06F 11/3656 714/38.14 |
| 9,519,803 B2 * | 12/2016 | Dewan | G06F 21/64 |
| 9,710,401 B2 * | 7/2017 | Rozas | G06F 12/1408 |
| 9,710,622 B2 * | 7/2017 | Pandey | G06F 21/12 |

(Continued)

OTHER PUBLICATIONS

"Fork (system call)", Jul. 18, 2014, an archived webpage from wikipedia.org, retrieved from <http://web.archive.org/web/20140718174730/http://en.wikipedia.org/wiki/Fork_(system_call)>, retrieved on Jan. 22, 2017.*

(Continued)

*Primary Examiner* — Jason K. Gee
*Assistant Examiner* — Zhimei Zhu
(74) *Attorney, Agent, or Firm* — Trop, Pruner & Hu, P.C.

(57) ABSTRACT

In an embodiment, at least one machine-readable storage medium includes instructions that when executed enable a system to receive, at a special library of a parent process located outside of a parent protected region of the parent process, from the parent protected region of the parent process, a call to create a child process and responsive to the call received at the special library, issue by the special library a first request and a second request. The first request is to execute, by a processor, a non-secure instruction to create the child process. The second request is to execute, by the processor, a first secure instruction to create a child protected region within the child process. Responsive to the first request the child process is to be created and responsive to the second request the child protected region is to be created. Other embodiments are described and claimed.

19 Claims, 5 Drawing Sheets

(56) References Cited

U.S. PATENT DOCUMENTS

| | | | | |
|---|---|---|---|---|
| 2005/0251803 | A1* | 11/2005 | Turner | G06F 9/4843 |
| | | | | 718/100 |
| 2012/0110337 | A1* | 5/2012 | Murphey | G06F 21/10 |
| | | | | 713/182 |
| 2012/0159184 | A1* | 6/2012 | Johnson | G06F 12/1466 |
| | | | | 713/189 |
| 2012/0216049 | A1* | 8/2012 | Boivie | G06F 21/57 |
| | | | | 713/189 |
| 2013/0159726 | A1* | 6/2013 | McKeen | G06F 21/72 |
| | | | | 713/189 |
| 2014/0095821 | A1* | 4/2014 | Yang | G06F 17/30091 |
| | | | | 711/162 |
| 2014/0137184 | A1* | 5/2014 | Russello | G06F 21/60 |
| | | | | 726/1 |
| 2014/0282935 | A1* | 9/2014 | Lal | G06F 21/72 |
| | | | | 726/6 |
| 2014/0297962 | A1* | 10/2014 | Rozas | G06F 12/0808 |
| | | | | 711/135 |
| 2015/0033034 | A1* | 1/2015 | Gerzon | H04L 9/3239 |
| | | | | 713/190 |
| 2015/0089502 | A1* | 3/2015 | Horovitz | G06F 9/45545 |
| | | | | 718/1 |
| 2015/0347768 | A1* | 12/2015 | Martin | G06F 21/62 |
| | | | | 726/1 |
| 2016/0246720 | A1* | 8/2016 | Pandey | G06F 21/12 |
| 2016/0378688 | A1* | 12/2016 | Rozas | G06F 12/1408 |
| | | | | 713/190 |
| 2017/0185533 | A1* | 6/2017 | Rozas | G06F 12/1408 |

OTHER PUBLICATIONS

"IBM Knowledge Center—Using nested enclaves", retrieved online from <https://www.ibm.com/support/knowledgecenter/en/SSLTBW_2.3.0/com.ibm.zos.v2r3.ceea200/clcnstl.htm>, retrieved on Sep. 8, 2017.*

McKeen, Frank, et al., "Innovative Instructions and Software Model for Isolated Execution," Intel Corporation, Aug. 14, 2013 HASP '13 Proceedings of the 2nd International Workshop on Hardware and Architectural Support for Security and Privacy, 8 pages.

Hoekstra, Matthew, et al., "Using Innovative Instructions to Create Trustworthy Software Solutions," Intel Corporation, Aug. 14, 2013 HASP '13 Proceedings of the 2nd International Workshop on Hardware and Architectural Support for Security and Privacy, 8 pages.

Anati, Ittai, et al., "Innovative Technology for CPU Based Attestation and Sealing," Intel Corporation, Aug. 14, 2013 HASP '13 Proceedings of the 2nd International Workshop on Hardware and Architectural Support for Security and Privacy, 7 pages.

* cited by examiner

APPARATUS AND METHOD FOR IMPLEMENTING A FORKED SYSTEM CALL IN A SYSTEM WITH A PROTECTED REGION

TECHNICAL FIELD

Embodiments pertain to security in computing systems.

BACKGROUND

Security of digital information has become increasingly important, particularly when the information has commercial value, is confidential, or relates to a sensitive topic. In some instances digital information may be provisioned on a client device that is infested with malware. If left unchecked, such malware may compromise the security and/or integrity of digital information on the client device. For example, malware may attempt to access and/or obtain digital information from the client itself (e.g., from the client's storage or memory), from the information distribution pathway to the client, and/or from the pathway that enables a user of the client to view or otherwise interact with the digital information. A successful malware attack on any one of those areas may compromise the security of the digital information, and may result in access to and/or modification of the information by an unauthorized party.

Computer systems may handle sensitive and valuable information that is to be protected from tampering and theft. To counter such tampering or theft, a protected execution environment may be employed.

DETAILED DESCRIPTION

Figure 1:
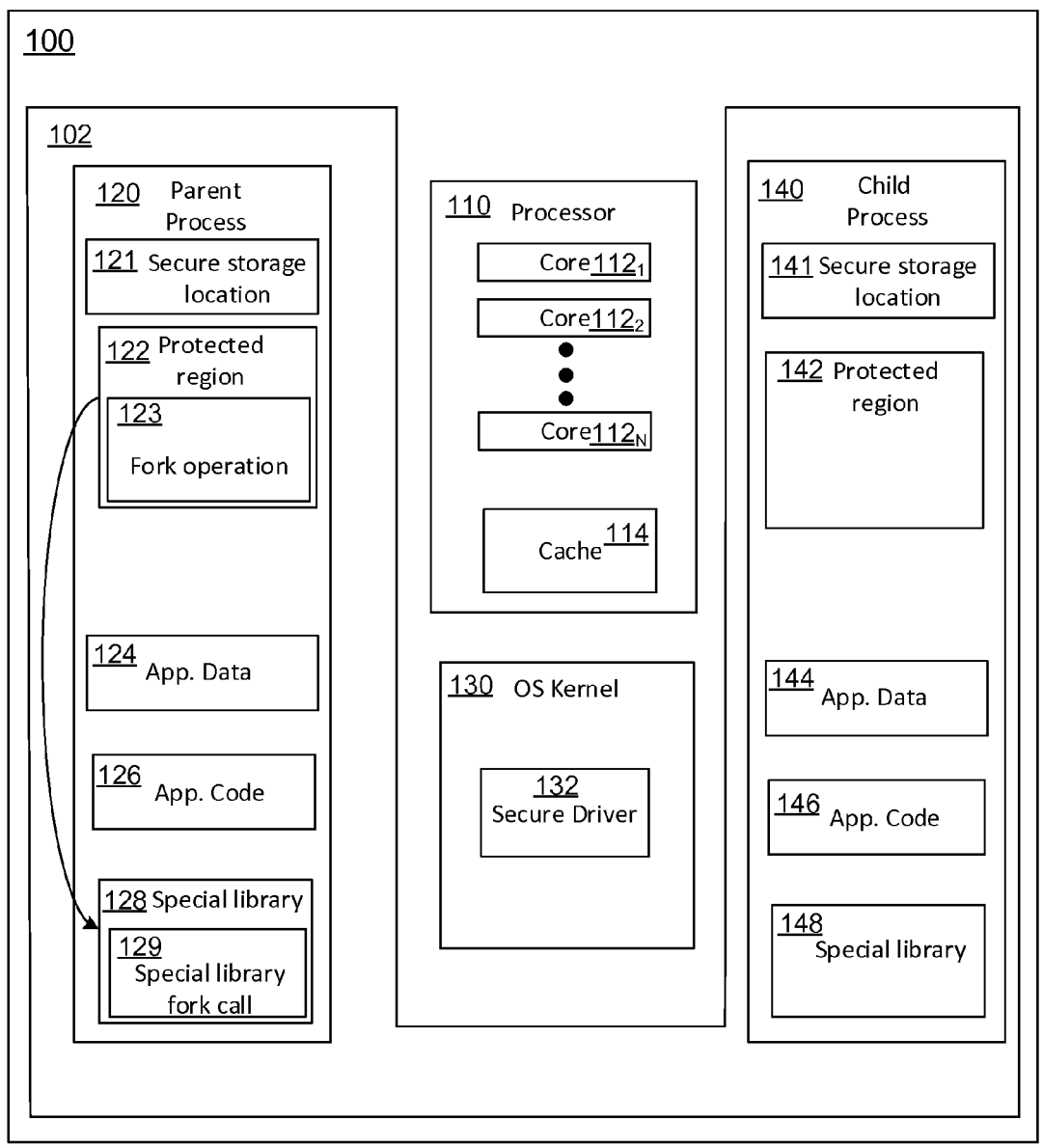
FIG. 1 is a block diagram of a system in accordance with an embodiment of the present invention.

An approach to maintaining security of data in a computing system is through use of a trusted execution environment (TEE) (e.g., protected execution environment) that may employ one or more secure instructions and may include one or more protected regions (e.g., trusted enclaves (TE), also enclaves herein). A protected region (e.g., a portion of a memory) is to provide confidentiality and protect integrity of information within the protected region against malware. A property of a protected region is that attempted accesses to the protected region by software that is not resident in the protected region may be prevented. For instance, attempted accesses by software such as virtual machine monitors, basic input output system (BIOS), and operating systems may be prevented. A secure instruction may be invoked to instantiate a protected region within a memory such as a dynamic random access memory (DRAM), non-volatile random access memory (NVRAM), or a combination thereof.

A TEE may include a hardware-based isolation mechanism and a software environment within the hardware-protected region. Intel® Software Guard Extensions (SGX) is an example of a trusted execution environment (TEE), and may include a set of instructions (e.g., secure instructions, also trusted instructions) to be included in Intel® Architecture. SGX may be used to create one or more protected regions.

System calls such as Linux and Unix® fork ( ) system calls (also fork command, fork system call, or fork call herein), in which a process creates a copy of itself, may be problematic in a TEE with protected regions. Difficulties may become especially apparent when trying to run programs written in interpreted languages (e.g., Python or Java) in a protected region (also enclave or secure enclave herein). For example, if a Python interpreter or a Java virtual machine issues a fork request to create a child process that is substantially identical to a parent process, properties of forked child process behavior may not be defined in a TEE and there may not be a defined method to create the child process in the TEE.

In embodiments, a fork system call may be implemented from a parent process in a system that has one or more protected regions. Embodiments may include modifications to secure data structures to implement the fork system call.

The fork system call for a process with a protected region may be implemented via a special library (e.g., a special software library), which differs from a library utilized in a regular (e.g., non-fork) system call. A parent secure storage location (e.g., a control structure such as a parent secure enclave control structure) associated with a parent protected region may include metadata and may be linked to a secure storage location of a child process (e.g., child secure enclave control structure). A child protected region running in a forked child process may have a same cryptographic signature as the corresponding protected region in its parent process, and so pages may be copied from the parent protected region to the child protected region. In embodiments, a first special instruction (e.g., secure instruction) may be invoked to perform child protected region creation, and a second special instruction may be invoked to copy pages from the parent protected region to the child protected region.

Embodiments may include some or all of the following components:

Parent process
Parent process secure storage location
Parent protected region containing a fork command
Parent process (non-secure) application data
Parent process (non-secure) application code
Parent (non-secure) special library that handles fork calls
OS kernel
Secure driver in the OS kernel
Child process
Child process secure storage location
Child protected region containing a fork command
Child process (non-secure) application data
Child process (non-secure) application code
Child (non-secure) special library
Other components may also be included.

FIG. 1 is a block diagram of a system, according to an embodiment of the present invention. System 100 includes a dynamic random access memory (DRAM) 102 that includes a parent process 120 and a child process 140, a processor 110, and an operating system (OS) kernel 130. The processor 110 includes one or more cores 112, ($112_1$-$112_N$) and a cache 114, and may include additional components (not shown). The processor 110 may include secure (e.g., trusted) hardware enabled to execute one or more secure (e.g., trusted) instructions within a TEE, and may serve as a "root of trust" of the TEE (or may be coupled to the root of trust). A secure instruction may be invoked to create a protected region, to transfer information to a protected region, etc. The parent process 120 includes a protected region 122 within which a fork operation 123 resides.

In a non-secure environment (e.g., outside of a protected region), a fork operation is to instantiate a child process that is a duplicate of the process in which the fork operation is executed. However, when the fork operation is within a protected region, e.g., the fork operation 123 within the protected region 122, such duplication is not permitted, as data within the protected region is not permitted to leave a trusted execution environment that includes the protected region.

In embodiments, the fork operation 123 may be called within the protected region 122 of a parent process 120. The fork operation 123 is to create a child process 140 that is substantially a duplicate of the parent process 120. When the fork operation 123 is invoked, an outside call (Ocall) may be sent from the protected region 122 to a special library 128 located in a non-protected portion of the parent process 120, the non-protected portion located outside of the protected region 123. The special library 128 may cause an operating system (OS) kernel 130 to invoke a non-secure (e.g., non-trusted) instruction to be executed by the processor 110 to create a child process 140. After creation of the child process 140, (non-secure) application data 144 may be copied to the child process 140 from the parent application data 124, (non-secure) application code 146 may be copied to the child process 140 from the parent application code 126, and a (non-secure) special library 148 may be copied to the child process 140 from the special library 128.

Additionally, the special library 128 may invoke a special library fork call 129 that calls a trusted (e.g. SGX) driver 132, which may invoke a secure instruction ("Echild_create") within the processor 110 to create a child protected region 142. Execution of the Echild_create secure instruction may also result in creation of a child secure storage location 141 associated with the child protected region 142 and that is to have a same cryptographic signature as a parent secure storage location 121 associated with the parent protected region 122. A trusted link may be established between the parent secure storage location 121 and the child secure storage location 141 (e.g., by an instruction executed by the processor 110). The child protected region 142 may make a call (protected region—to —protected region call, "Echild_copy") to the parent protected region 122 in order to copy pages into the child protected region 142.

After creation of the child process 140 (including child protected region 142, secure storage location 141, special library 148, application data 148, and application code 146) is complete, the child process 140 may be utilized instead of the parent process 120 and the parent process 120 may be used for another purpose.

Figure 2:
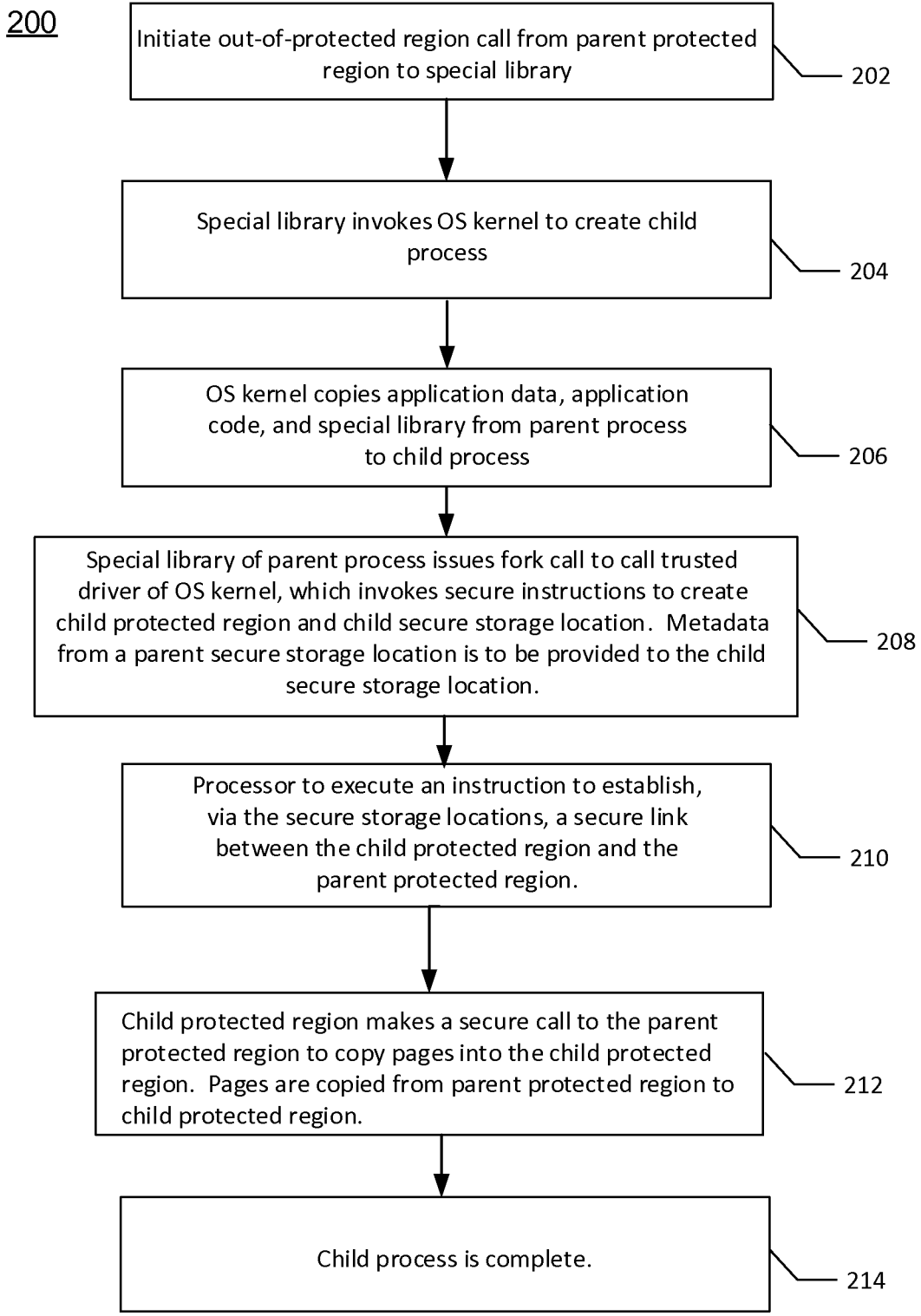
FIG. 2 is a flow diagram of a method, according to an embodiment of the present invention.

FIG. 2 is a flow diagram of a method 200, according to an embodiment of the present invention. At block 202, a parent protected region within a parent process of a system initiates an outside call, e.g., out-of-protected region call that originates within a protected region of the parent process to a special library located in a non-protected region within the parent process, in order to create a child process that includes a child protected region. Continuing to block 204, the special library invokes an operating system (OS) kernel to create a child process. The child process may be created via execution of non-secure instruction(s) on a processor.

Advancing to block 206, the OS kernel executes (non-secure) instructions on the processor of the system to copy, from the parent process into the child process, non-protected application data, non-protected application code, and the (non-protected) special library. Moving to block 208, the special library may issue a special library fork call to a trusted (e.g. secure) driver (e.g., SGX driver) of the OS kernel, which invokes a secure instruction to create a child protected region and a child secure storage location that is to store metadata substantially identical to a parent secure storage location of the parent process including a substantially identical trusted cryptographic signature associated with the parent protected region. Metadata from the parent secure storage location is to be copied to the child secure storage location.

Advancing to block 210, the processor executes an instruction to set up via the parent secure storage location and the child secure storage location a secure (e.g., trusted) link between the parent protected region and the child protected region.

Moving to block 212, the child protected region makes a secure call into the parent protected region to copy pages into the child protected region, and the pages are copied from the parent protected region to the child protected region. Proceeding to block 214, the child process is complete and can replace the parent process.

Figure 3:
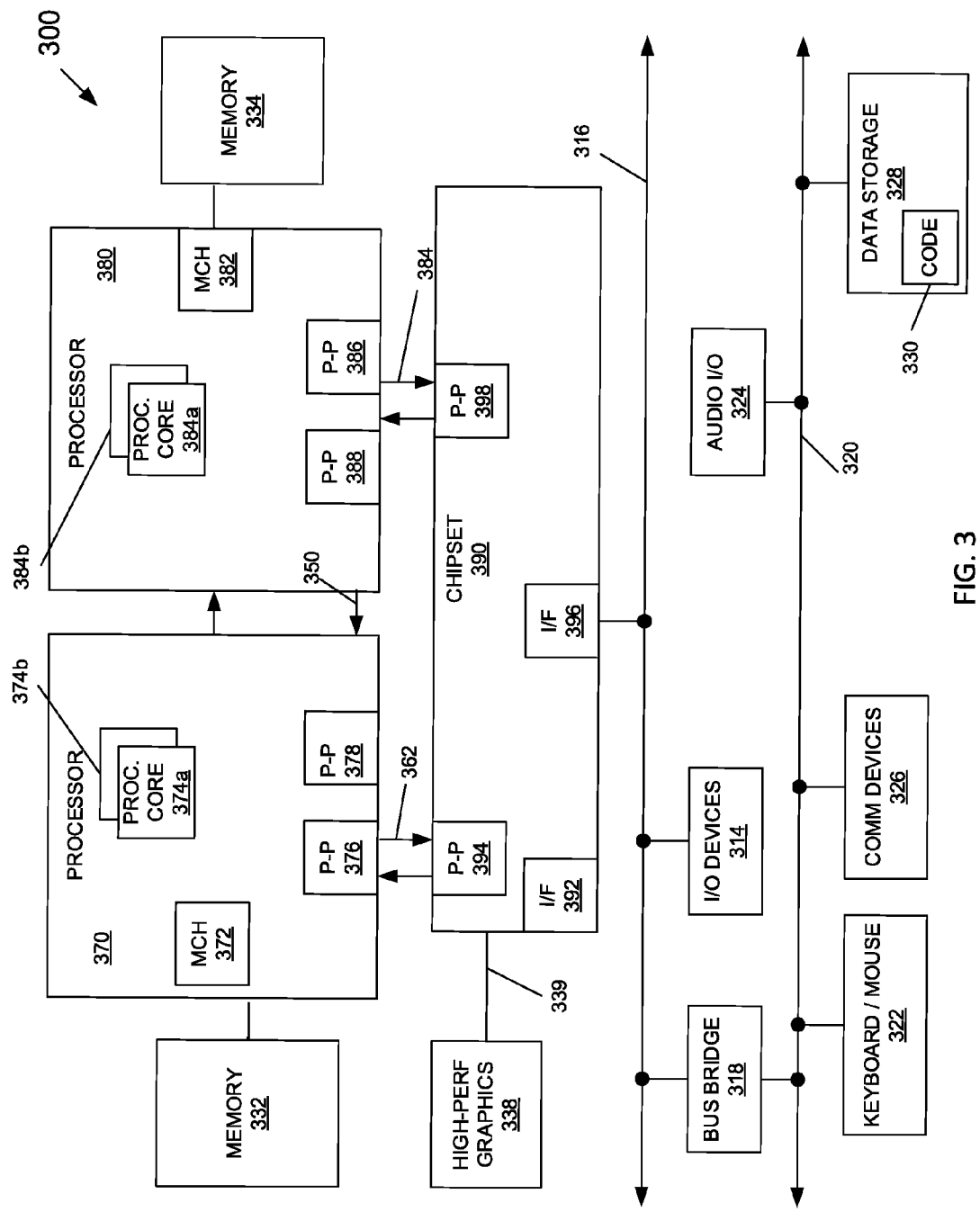
FIG. 3 is a block diagram of a system in accordance with an embodiment of the present invention.

Embodiments may be implemented in many different system types. Referring now to FIG. 3, shown is a block diagram of a system in accordance with an embodiment of the present invention. As shown in FIG. 3, multiprocessor system 300 is a point-to-point interconnect system, and includes a first processor 370 and a second processor 380 coupled via a point-to-point interconnect 350. As shown in FIG. 3, each of processors 370 and 380 may be multicore processors, including first and second processor cores (i.e., processor cores 374a and 374b and processor cores 384a and 384b), although potentially many more cores may be present in the processors. Portions of memory 332 and/or memory 334 may be included a trusted execution environment (TEE) that includes a parent process with a parent protected region that can issue an outside call to a non-secure library (special library) in order to create a child process that includes a child protected region, according to embodiments of the present invention.

Still referring to FIG. 3, first processor 370 further includes a memory controller hub (MCH) 372 and point-to-point (P-P) interfaces 376 and 378. Similarly, second processor 380 includes a MCH 382 and P-P interfaces 386 and 388. As shown in FIG. 3, MCHs 372 and 382 couple the processors to respective memories, namely a memory 332 and a memory 334, which may be portions of system memory (e.g., DRAM) locally attached to the respective processors. The memory 332 and the memory 334 may include a trusted execution environment (TEE) portion including one or more protected regions, as in embodiments of the present invention. First processor 370 and second processor 380 may be coupled to a chipset 390 via P-P interconnects 362 and 384, respectively. As shown in FIG. 3, chipset 390 includes P-P interfaces 394 and 398.

Furthermore, chipset 390 includes an interface 392 to couple chipset 390 with a high performance graphics engine 338 via a P-P interconnect 339. In turn, chipset 390 may be coupled to a first bus 316 via an interface 396. As shown in FIG. 3, various input/output (I/O) devices 314 may be coupled to first bus 316, along with a bus bridge 318, which couples first bus 316 to a second bus 320. Various devices may be coupled to second bus 320 including, for example, a keyboard/mouse 322, communication devices 326 and a data storage unit 328 such as a disk drive or other mass storage device which may include code 330, in one embodiment. Further, an audio input/output (I/O) 324 may be coupled to second bus 320. Embodiments can be incorporated into other types of systems including mobile devices such as a smart cellular telephone, tablet computer, netbook, Ultrabook™, or so forth.

Figure 4:
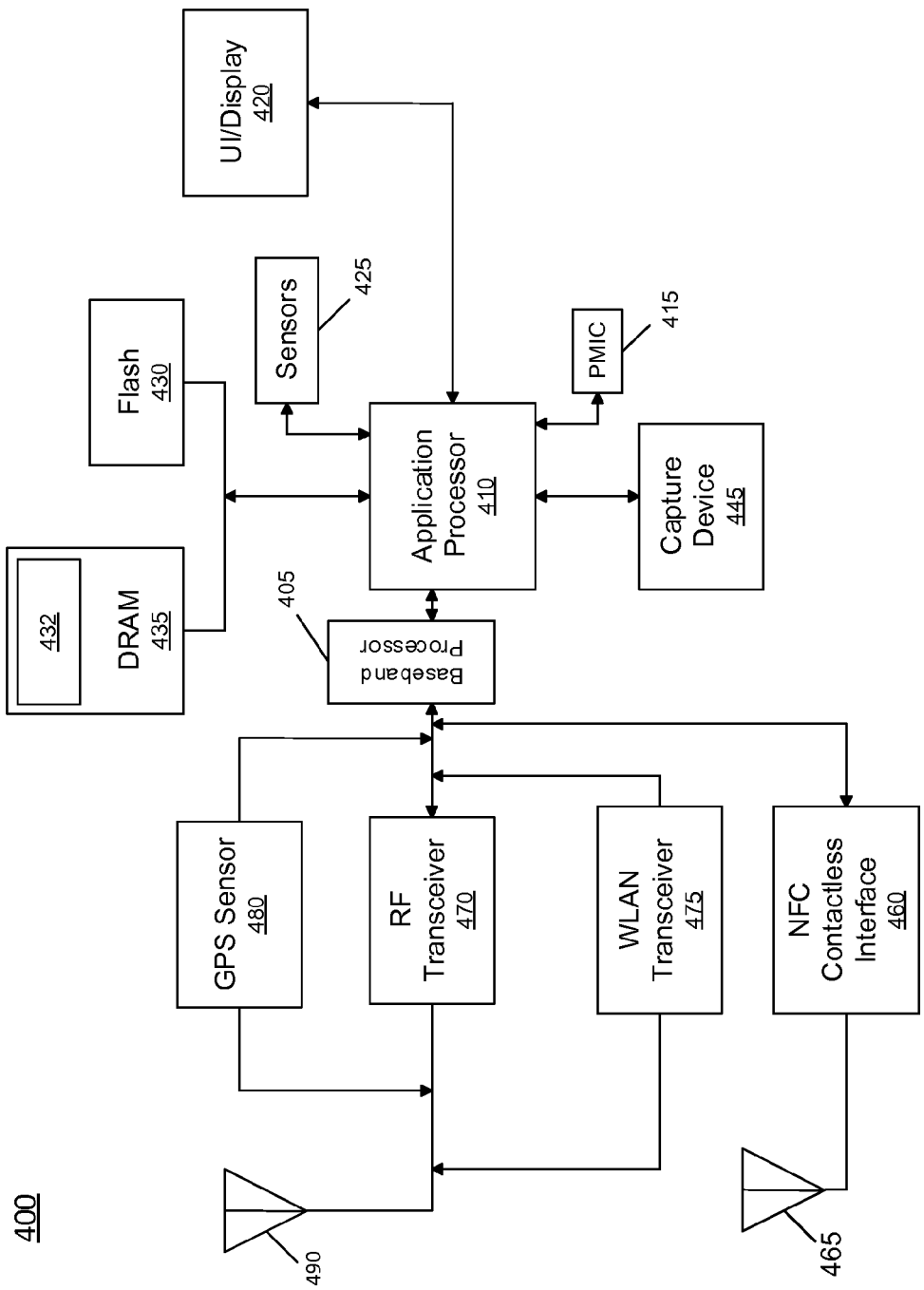
FIG. 4 is a block diagram of a system in accordance with another embodiment of the present invention.

Referring now to FIG. 4, shown is a block diagram of another example system with which embodiments can be used. As seen, system 400 may be a smartphone or other wireless communicator. A baseband processor 405 is configured to perform various signal processing with regard to communication signals to be transmitted from or received by the system. In turn, baseband processor 405 is coupled to an application processor 410, which may be a main processor of the system to execute an OS and other system software, in addition to user applications such as many well-known social media and multimedia apps. Application processor 410 may further be configured to execute a secure instruction to create a child protected region within a child process, responsive to an outside call from a parent protected region of the parent process to a (non-protected) special library located outside of the protected region of the parent process, as described herein.

In turn, application processor 410 can couple to a user interface/display 420, e.g., a touch screen display. In addition, application processor 410 may couple to a memory system including a non-volatile memory, namely a flash memory 430 and a system memory, namely a DRAM 435. In some embodiments, DRAM 435 may include a portion 432 in which the parent process and the child process may reside. As further seen, application processor 410 also couples to a capture device 445 such as one or more image capture devices that can record video and/or still images. A plurality of sensors 425 may couple to application processor 410 to enable input of a variety of sensed information such as accelerometer and other environmental information.

As further illustrated, a near field communication (NFC) contactless interface 460 is provided that communicates in a NFC near field via an NFC antenna 465. While separate antennae are shown in FIG. 4, understand that in some implementations one antenna or a different set of antennae may be provided to enable various wireless functionality.

A power management integrated circuit (PMIC) 415 couples to application processor 410 to perform platform level power management. To this end, PMIC 415 may issue power management requests to application processor 410 to enter certain low power states as desired. Furthermore, based on platform constraints, PMIC 415 may also control the power level of other components of system 400.

To enable communications to be transmitted and received, various circuitry may be coupled between baseband processor 405 and an antenna 490. Specifically, a radio frequency (RF) transceiver 470 and a wireless local area network (WLAN) transceiver 475 may be present. In general, RF transceiver 470 may be used to receive and transmit wireless data and calls according to a given wireless communication protocol such as 3G or 4G wireless communication protocol such as in accordance with a code division multiple access (CDMA), global system for mobile communication (GSM), long term evolution (LTE) or other protocol. In addition a GPS sensor 480 may be present, with location information being provided to security processor 450 for use as described herein. Other wireless communications such as receipt or transmission of radio signals, e.g., AM/FM and other signals may also be provided. In addition, via WLAN transceiver 475, local wireless communications, such as according to a Bluetooth™ or IEEE 802.11 standard can also be realized.

Figure 5:
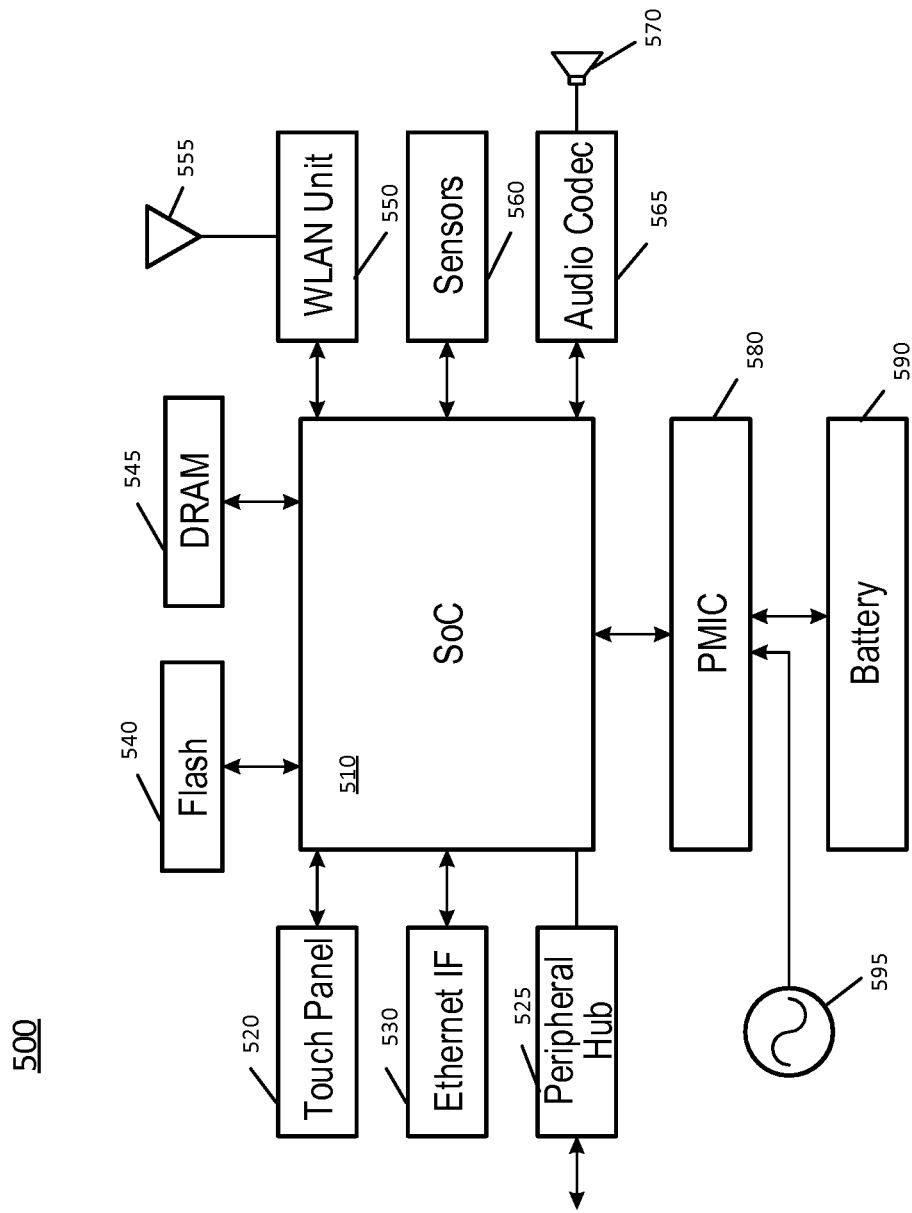
FIG. 5 is a block diagram of a system in accordance with another embodiment of the present invention.

Referring now to FIG. 5, shown is a block diagram of another example system with which embodiments may be used. In the illustration of FIG. 5, system 500 may be mobile low-power system such as a tablet computer, 2:1 tablet, fablet or other convertible or standalone tablet system. As illustrated, a SoC 510 is present and may be configured to operate as an application processor for the device, and to execute a secure instruction to create a child protected region within a child process, responsive to an outside call from a parent protected region to a non-protected library located outside of the protected region of the parent process, according to embodiments described herein.

A variety of devices may couple to SoC 510. In the illustration shown, a memory subsystem includes a flash memory 540 and a DRAM 545 coupled to SoC 510. To this end, SoC 510 may include an integrated memory controller to handle communications with DRAM 545, and set up and protect one or more protected regions within this memory (e.g., SMRAM) as described herein. In addition, a touch panel 520 is coupled to the SoC 510 to provide display capability and user input via touch, including provision of a virtual keyboard on a display of touch panel 520. To provide wired network connectivity, SoC 510 couples to an Ethernet interface 530. A peripheral hub 525 is coupled to SoC 510 to enable interfacing with various peripheral devices, such as may be coupled to system 500 by any of various ports or other connectors.

In addition to internal power management circuitry and functionality within SoC 510, a power management integrated circuit (PMIC) 580 is coupled to SoC 510 to provide platform-based power management, e.g., based on whether the system is powered by a battery 590 or AC power via an AC adapter 595. In addition to this power source-based power management, PMIC 580 may further perform platform power management activities based on environmental and usage conditions. Still further, PMIC 580 may communicate control and status information to SoC 510 to cause various power management actions within SoC 510.

Still referring to FIG. 5, to provide for wireless capabilities, a WLAN unit 550 is coupled to SoC 510 and in turn to an antenna 555. In various implementations, WLAN unit 550 may provide for communication according to one or more wireless protocols, including an IEEE 802.11 protocol, a Bluetooth™ protocol or any other wireless protocol.

As further illustrated, a plurality of sensors 560 may couple to SoC 510. These sensors may include various accelerometer, environmental and other sensors, including user gesture sensors. Finally, an audio codec 565 is coupled to SoC 510 to provide an interface to an audio output device 570. Of course understand that while shown with this particular implementation in FIG. 5, many variations and alternatives are possible.

Additional embodiments are described below.

In a $1^{st}$ embodiment, at least one machine-readable storage medium includes instructions that when executed enable a system to: receive, at a special library located outside of a parent protected region of a parent process from a parent protected region of the parent process, a call to create a child process and responsive to the call received at the non-protected special library, issue by the special library a first request to execute, by a processor, a non-secure instruction to create the child process and a second request to execute, by the processor, a first secure instruction to create a child protected region within the child process. Responsive to the first request the child process is to be created and responsive to the second request the child protected region is to be created.

A $2^{nd}$ embodiment includes elements of the $1^{st}$ embodiment. Additionally, the at least one machine-readable storage medium includes instructions that when executed enable the system, further responsive to the call to create the child process, to issue by the special library a third request to execute, by the processor, non-secure application creation code to create child application data and child application code in the child process based on parent application data and parent application code stored in the parent process. Responsive to the third request the child application data and child application code are to be created within the child process.

A $3^{rd}$ embodiment includes elements of the $1^{st}$ embodiment. Additionally, the at least one machine-readable storage medium includes instructions that when executed enable the system to, further responsive to the call to create the child process, issue by the special library a fourth request to execute, by the processor, a library creation instruction to create a child non-protected library in the child process, the child non-protected library based on the parent non-protected library. In response to the fourth request, the child non-protected library is to be created within the child process.

A $4^{th}$ embodiment includes elements of the $1^{st}$ embodiment. Additionally, the at least one machine-readable storage medium includes instructions that when executed enable the system to, further responsive to the call to create the child process, issue by the special library a fifth request to execute, by the processor, a second secure instruction to create within the child process a child secure storage location that is to include a cryptographic signature substantially identical to a parent cryptographic signature stored in a parent secure storage location of the parent process. Responsive to the fifth request, the child secure storage location is to be created within the child process.

A $5^{th}$ embodiment includes elements of the $4^{th}$ embodiment. Additionally, the at least one machine-readable storage medium includes instructions that when executed enable the system to establish a trusted link between the parent protected region and the child protected region.

A $6^{th}$ embodiment includes elements of the $5^{th}$ embodiment. The at least one machine-readable storage medium further includes instructions that when executed enable the system to, after the trusted link between the parent protected region and the child protected region is established, send a data request from the child protected region to the parent protected region, wherein responsive to the data request, the child protected region is to receive data stored in the parent protected region via the secure link.

A $7^{th}$ embodiment includes elements of the $6^{th}$ embodiment. Additionally, the at least one machine-readable storage medium of claim includes instructions that when executed enable the system to replace use of the parent process by the child process.

An $8^{th}$ embodiment is a method that includes receiving a fork command from a parent protected region of a parent process to a non-secure library of the parent process, the fork command associated with creation of a child process. The method also includes responsive to receipt of the fork command, issuing by the non-secure library a first request to create a child process via execution of a non-trusted instruction by a processor, and issuing a second request from the non-secure library to create a child protected region within the child process via execution of a trusted instruction by a trusted core of the processor. Responsive to the first request the child process is to be created and responsive to the second request the child protected region is to be created within the child process.

A $9^{th}$ embodiment includes elements of the $8^{th}$ embodiment. Additionally, the parent process and the child process are to be located in a dynamic random access memory (DRAM).

A $10^{th}$ embodiment includes elements of the $8^{th}$ embodiment, and further includes responsive to receipt of the fork command, issuing by the non-secure library a third request to create non-secure child application data in the child process based on parent application data stored in a first non-secure portion of the parent process and to create non-secure child application code in the child process based on parent application code stored in a second non-secure portion of the parent process, and where responsive to the third request the non-secure child application data is to be created in the child process and the non-secure application code is to be created in the child process.

An $11^{th}$ embodiment includes elements of the $8^{th}$ embodiment, and further includes responsive to receipt of the fork command, issuing a fourth request by the non-secure library to the processor to create a child non-secure library in the child process based on the parent non-secure library. Responsive to the fourth request the child non-secure library is to be created within a non-secure region of the child process.

A $12^{th}$ embodiment includes elements of the $8^{th}$ embodiment, and further includes responsive to receipt of the fork command by the non-secure library, issuing a fifth request by the non-secure library to the processor to create within the child process a child secure storage location in a secure portion of the child process and associated with the child protected region, the child secure storage location based on a parent secure storage location in the parent process that is to store secure metadata associated with the parent protected region, and responsive to the fifth request, creating the child secure storage location in the secure portion of the child process. The child storage location is to be provided with the secure metadata of the parent secure storage location, and after receipt of the secure metadata the child secure storage location is to enable a secure link to be set up between the parent protected region and the child protected region.

A $13^{th}$ embodiment includes elements of the $12^{th}$ embodiment, and further includes establishing the secure link between the parent protected region and the child protected region, issuing a data request from the child protected region via the processor to the parent protected region, and responsive to the request receiving, by the child protected region via the secure link, data stored in the parent protected region.

A $14^{th}$ embodiment includes elements of the $8^{th}$ embodiment. Additionally, the non-secure library is to, responsive to the fork command, cause a trusted driver portion of an operating system kernel to invoke execution of the trusted instruction by the processor to create the child protected region.

A $15^{th}$ embodiment includes an apparatus to perform the method of any one of embodiments 8 to 14.

A $16^{th}$ embodiment includes an apparatus that includes means for performing the method of any one of embodiments 8 to 14.

A $17^{th}$ embodiment is a system that is to include a processor including at least one trusted core to execute a trusted instruction to create a child enclave of a child process that includes a first trusted region of a child process, where the trusted instruction is to be invoked responsive to a call initiated by a parent enclave that includes a first trusted region of a parent process to a parent special library that is located in a non-trusted region of the parent process to instantiate the child process based on the parent process. The system is also to include a storage means for storing the child enclave.

An 18$^{th}$ embodiment includes elements of the 17$^{th}$ embodiment, where the processor is further to execute a non-trusted instruction to create the child process responsive to the call and to store the child process in the storage means.

A 19$^{th}$ embodiment includes elements of the 17$^{th}$ embodiment. Further, the processor is also to create a child secure storage location associated with the child enclave and located in a second trusted region of the child process, the child secure storage location based on a parent secure storage location that includes a second trusted region of the parent process and is associated with the parent enclave, and the secure storage location is to include a child measurement of the child enclave that is substantially identical to a parent measurement of the parent enclave that is stored in the parent secure storage location.

A 20$^{th}$ embodiment is to include elements of the 19$^{th}$ embodiment. Additionally, the processor is to establish a trusted link between the parent enclave and the child enclave and after establishment of the trusted link the processor is to receive a data request from the child enclave and responsive to the data request, the processor is to enable transmission of the data stored in the parent enclave to the child enclave via the trusted link.

A 21$^{st}$ embodiment includes elements of the 17$^{th}$ embodiment. Additionally, responsive to the call to instantiate the child process, the processor is to create in the child process a child non-trusted library based on the parent non-trusted library by execution of a non-secure instruction, the non-trusted library to be located in a non-trusted region of the child process.

A 22$^{nd}$ embodiment includes elements of the 17$^{th}$ embodiment. Additionally, responsive to the call to instantiate the child process, the processor is to create child application code in the child based on parent application code that is located in the non-trusted region of the parent process.

A 23$^{rd}$ embodiment includes elements of the 17$^{th}$ embodiment, where the special library is to, responsive to the call, cause a trusted driver portion of an operating system kernel to invoke execution of the trusted instruction by the processor to create the child enclave.

A 24$^{th}$ embodiment is a system that includes a processor including at least one trusted core to execute a secure instruction. The system also includes a storage means for storing a parent process that includes a parent enclave in a parent protected region and a parent special library in a non-protected region. The parent enclave is to issue a call to the parent special library to instantiate a child process that is based on the parent process. The child process is to include a child enclave in a child protected region of the child process. The child process is to be instantiated responsive to the call. The child enclave is to be instantiated responsive to execution of the secure instruction that is to be invoked responsive to the call.

A 25$^{th}$ embodiment includes elements of the 24$^{th}$ embodiment. The processor is further to execute a first non-secure instruction to instantiate the child process responsive to the call.

A 26$^{th}$ embodiment includes elements of the 24$^{th}$ embodiment, where the child process is also to include a child secure storage location associated with the child enclave and that is to be created responsive to the call the processor, the secure storage location to include a trusted signature that is substantially identical to a trusted signature associated with the parent enclave.

A 27$^{th}$ embodiment includes elements of the 24$^{th}$ embodiment. Additionally, a secure link is to be established between the parent enclave and the child enclave by the processor.

A 28$^{th}$ embodiment includes elements of the 27$^{th}$ embodiment. Additionally, after establishment of the secure link, responsive to a request issued by the child enclave to the parent enclave, the processor is to send data stored in the parent enclave to the child enclave via the secure link.

A 29$^{th}$ embodiment includes elements of the 24$^{th}$ embodiment. The storage means is further for storing, within a non-protected region of the child process, a child special library based on the parent special library. Additionally, the child special library is to be instantiated by execution of a non-secure instruction by the processor.

A 30$^{th}$ embodiment includes elements of the 29$^{th}$ embodiment. Additionally, the storage means is further for storing, in the non-protected region of the child process, child application code that is based on parent application code within a non-protected region of the parent process.

A 31$^{st}$ embodiment includes elements of the 24$^{th}$ embodiment. Additionally, the non-secure library is to, responsive to the call, cause a secure driver portion of an operating system kernel to invoke execution of the secure instruction by the processor to create the child enclave.

A 32$^{nd}$ embodiment includes elements of any one of embodiments 24 to 31. Additionally, after the child process is instantiated, the child process is to replace the parent process.

Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. Embodiments also may be implemented in data and may be stored on a non-transitory storage medium, which if used by at least one machine, causes the at least one machine to fabricate at least one integrated circuit to perform one or more operations. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. At least one non-transitory machine-readable storage medium including instructions that when executed enable a system to:
receive, in response to a fork operation in a parent protected region of a parent process, at a library of the parent process located in a parent non-protected region of the parent process outside of the parent protected region of the parent process, from the parent protected region of the parent process, an outside call to create a child process; and
responsive to the outside call received at the library, issue by the library a first request to an operating system kernel to cause the operating system kernel to invoke execution, by a processor, of a non-secure instruction to create the child process and issue a second request to call a trusted driver to invoke execution, by the processor, of a first secure instruction to create a child protected region within the child process, wherein responsive to the first request the child process is to be created and responsive to the second request the child protected region is to be created.

2. The at least one non-transitory machine-readable storage medium of claim 1, further including instructions that when executed enable the system, further responsive to the outside call to create the child process, to issue by the library a third request to execute, by the processor, non-secure application creation code to create child application data and child application code in the child process based on parent application data and parent application code stored in the parent process, wherein responsive to the third request the child application data and child application code are to be created within the child process.

3. The at least one non-transitory machine-readable storage medium of claim 1, further including instructions that when executed enable the system to, further responsive to the outside call to create the child process, issue by the library a fourth request to execute, by the processor, a library creation instruction to create a child library in the child process, the child library based on the parent library, and in response to the fourth request, the child library is to be created within the child process.

4. The at least one non-transitory machine-readable storage medium of claim 1, further including instructions that when executed enable the system to, further responsive to the outside call to create the child process, issue by the library a fifth request to execute, by the processor, a second secure instruction to create within the child process a child secure storage location that is to include a cryptographic signature substantially identical to a parent cryptographic signature stored in a parent secure storage location of the parent process, and wherein responsive to the fifth request, the child secure storage location is to be created within the child process.

5. The at least one non-transitory machine-readable storage medium of claim 4, further including instructions that when executed enable the system to establish a secure link between the parent protected region and the child protected region.

6. The at least one non-transitory machine-readable storage medium of claim 5, further including instructions that when executed enable the system to, after the secure link between the parent protected region and the child protected region is established, send a data request from the child protected region to the parent protected region, wherein responsive to the data request, the child protected region is to receive data stored in the parent protected region via the secure link.

7. The at least one non-transitory machine-readable storage medium of claim 6, further including instructions that when executed enable the system to replace use of the parent process by the child process.

8. A method comprising: receiving a fork command from a parent protected region of a parent process in a non-secure library of the parent process located in a parent non-protected region of the parent process, the fork command associated with creation of a child process; and
responsive to receipt of the fork command, issuing by the non-secure library a first request to an operating system kernel to cause the operating system kernel to invoke a non-trusted instruction to create the child process via execution of the non-trusted instruction by a processor, and
issuing a second request by the non-secure library to a trusted driver to create a child protected region within the child process via execution of a trusted instruction by the trusted driver in execution on a trusted core of the processor, wherein responsive to the first request the child process is to be created and responsive to the second request the child protected region is to be created within the child process.

9. The method of claim 8, wherein the parent process and the child process are to be located in a dynamic random access memory (DRAM).

10. The method of claim 8, further comprising responsive to receipt of the fork command, issuing by the non-secure library a third request to create non-secure child application data in the child process based on parent application data stored in a first non-secure portion of the parent process and to create non-secure child application code in the child process based on parent application code stored in a second non-secure portion of the parent process, and wherein responsive to the third request the non-secure child application data is to be created in the child process and the non-secure application code is to be created in the child process.

11. The method of claim 8, further comprising responsive to receipt of the fork command, issuing a fourth request by the non-secure library to the processor to create a child non-secure library in the child process based on the parent non-secure library, wherein responsive to the fourth request the child non-secure library is to be created within a non-secure region of the child process.

12. The method of claim 8, further comprising responsive to receipt of the fork command by the non-secure library, issuing a fifth request by the non-secure library to the processor to create within the child process a child secure storage location in a secure portion of the child process and associated with the child protected region, the child secure storage location based on a parent secure storage location in the parent process that is to store secure metadata associated with the parent protected region, and responsive to the fifth request, creating the child secure storage location in the secure portion of the child process, wherein the child secure storage location is to be provided with the secure metadata of the parent secure storage location, and wherein after receipt of the secure metadata the child secure storage location is to enable a secure link to be set up between the parent protected region and the child protected region.

13. The method of claim 12, further comprising establishing the secure link between the parent protected region and the child protected region, issuing a data request from the child protected region via the processor to the parent protected region, and responsive to the request receiving, by the child protected region via the secure link, data stored in the parent protected region.

14. A system comprising:
a processor including at least one trusted core to execute a trusted instruction to create a child enclave that comprises a first trusted region of a child process, wherein the trusted instruction is to be invoked responsive to a call initiated by a parent enclave that comprises a first trusted region of a parent process to a parent non-trusted library that is located in a non-trusted region of the parent process, wherein the call is to instantiate the child process based on the parent process, wherein the parent non-trusted library is to issue a first request to an operating system kernel to cause the operating system kernel to invoke execution, by the processor, of a non-secure instruction to create the child process, and the parent non-trusted library is to issue a second request to call a trusted driver to invoke execution, by the processor, of the trusted instruction to create the child enclave; and
a dynamic random access memory (DRAM) to store the child enclave.

15. The system of claim 14, wherein the processor is further to execute the non-trusted instruction to create the child process responsive to the call and to store the child process in the DRAM.

16. The system of claim 14, wherein the processor is also to create a child secure storage location associated with the child enclave and located in a second trusted region of the child process, the child secure storage location based on a parent secure storage location that comprises a second trusted region of the parent process and is associated with the parent enclave and, the child secure storage location to include a measurement of the child enclave that is substantially identical to a measurement of the parent enclave that is stored in the parent secure storage location.

17. The system of claim 16, wherein the processor is to establish a trusted link between the parent enclave and the child enclave and after establishment of the trusted link the processor is to receive a data request from the child enclave and responsive to the data request, the processor is to enable data stored in the parent enclave to be sent to the child enclave via the trusted link.

18. The system of claim 14, wherein further responsive to the call to instantiate the child process, the processor is to create in the child process a child non-trusted library based on the parent non-trusted library by execution of the non-trusted instruction, wherein the child non-trusted library is to be located in a non-trusted region of the child process.

19. The system of claim 14, wherein further responsive to the call to instantiate the child process, the processor is to create child application code in a non-trusted region of the child process based on parent application code that is located in the non-trusted region of the parent process.

* * * * *